United States Patent
Sakib et al.

(10) Patent No.: US 12,461,396 B2
(45) Date of Patent: Nov. 4, 2025

(54) HEATING OF THERMO-OPTIC DEVICE

(71) Applicant: Intel Corporation, Santa Clara, CA (US)

(72) Inventors: Meer Nazmus Sakib, Berkeley, CA (US); Saeed Fathololoumi, Los Gatos, CA (US); Harel Frish, Albuquerque, NM (US); John Heck, Berkeley, CA (US); Eddie Bononcini, Corrales, NM (US); Reece Defrees, Rio Rancho, NM (US); Stanley J. Dobek, Rio Rancho, NM (US); Aliasghar Eftekhar, Fremont, CA (US); Walter Garay, Plano, TX (US); Lingtao Liu, Chandler, AZ (US); Wei Qian, Walnut, CA (US)

(73) Assignee: Intel Corporation, Santa Clara, CA (US)

( * ) Notice: Subject to any disclaimer, the term of this patent is extended or adjusted under 35 U.S.C. 154(b) by 985 days.

(21) Appl. No.: 17/358,256

(22) Filed: Jun. 25, 2021

(65) Prior Publication Data

US 2021/0318561 A1    Oct. 14, 2021

(51) Int. Cl.
*G02F 1/01* (2006.01)
*G02B 6/132* (2006.01)
*G02B 6/136* (2006.01)

(52) U.S. Cl.
CPC ........... *G02F 1/0147* (2013.01); *G02B 6/132* (2013.01); *G02B 6/136* (2013.01)

(58) Field of Classification Search
CPC .......... G02B 6/13; G02B 6/132; G02B 6/136; G02B 6/1345; G02B 6/122; G02B 6/1221; G02B 6/1225; G02B 5/4266; G02B 6/428; G02B 2006/12061; G02F 1/01; G02F 1/011; G02F 1/225; G02F 1/2257; G02F 1/0147; G02F 1/035; G02F 1/025; G02F 1/0113; G02F 1/0018; G02F 1/0316; H01L 21/486; H01L 21/84; H01L 21/4853; H01L 23/485; H01L 23/585; H01L 23/367; H01L 23/3675; H01L 23/3672; H01L 23/373
USPC ........ 359/288, 279, 315, 245, 248; 385/129, 385/131, 2–4, 14, 20, 24
See application file for complete search history.

(56) References Cited

U.S. PATENT DOCUMENTS

| | | | |
|---|---|---|---|
| 6,704,487 B2 * | 3/2004 | Parhami | G02F 1/3136 385/129 |
| 10,606,004 B2 | 3/2020 | Sharma et al. | |
| 11,137,283 B2 | 10/2021 | Balamurugan et al. | |
| 11,143,818 B2 | 10/2021 | Sakib et al. | |
| 2005/0169566 A1 * | 8/2005 | Takahashi | G02F 1/011 385/1 |
| 2021/0006044 A1 | 1/2021 | Hong et al. | |

(Continued)

*Primary Examiner* — Jie Lei
(74) *Attorney, Agent, or Firm* — Essential Patents Group, LLP

(57) ABSTRACT

A method may include: forming a base layer on a substrate; forming a waveguide assembly on the base layer, where the waveguide assembly is surrounded by a cladding layer; forming a trench opening through the cladding layer and the base layer; forming an undercut void by etching the substrate through the trench opening, where the undercut void extends under the waveguide assembly and the base layer; and filling the trench opening with a filler to seal off the undercut void. Other embodiments are described and claimed.

17 Claims, 9 Drawing Sheets

(56) References Cited

U.S. PATENT DOCUMENTS

2021/0149115 A1 5/2021 Huang et al.
2021/0175974 A1 6/2021 Eftekhar

\* cited by examiner

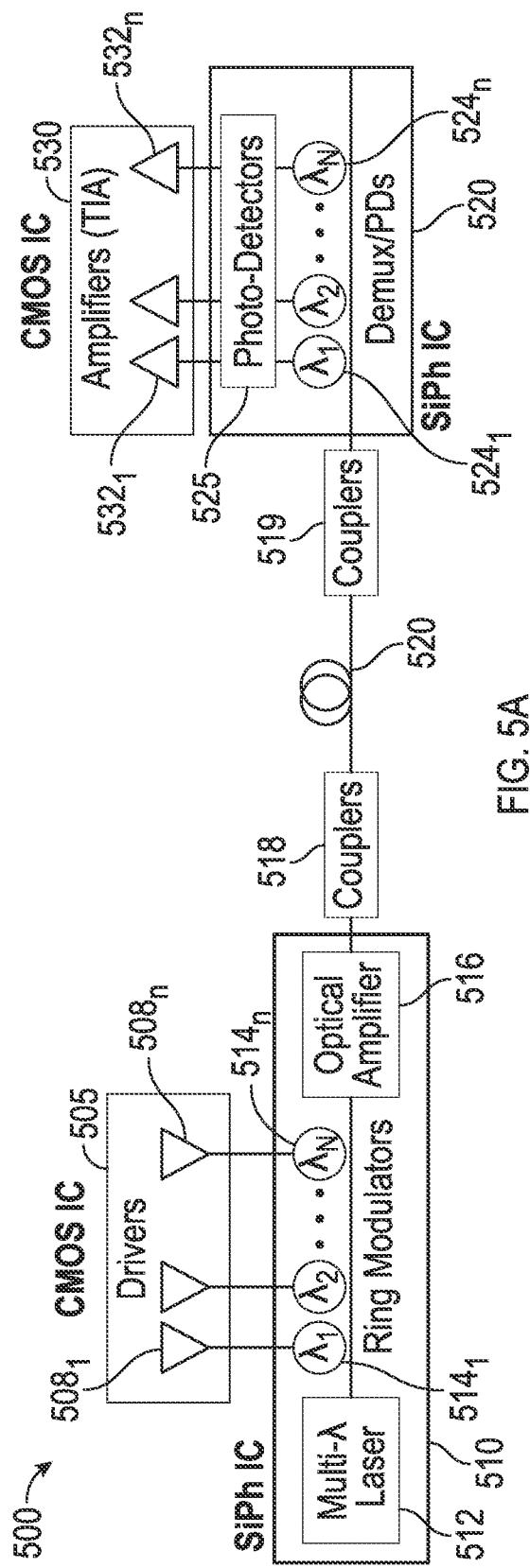
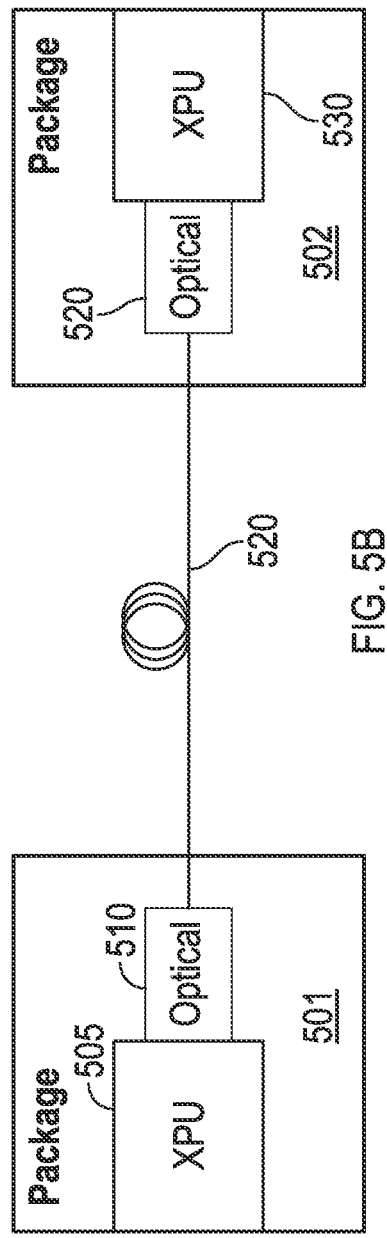
FIG. 5A
FIG. 5B

HEATING OF THERMO-OPTIC DEVICE

FIELD OF INVENTION

Embodiments relate generally to optical devices. More particularly, embodiments are related to heating of thermo-optic devices.

BACKGROUND

The growing bandwidth needs within data applications have involved the replacement of electronic components with optical components. For example, optical components may be used in data centers, supercomputers, and fiber-optic access networks.

BRIEF DESCRIPTION OF THE DRAWINGS

FIGS. 5A-5B are diagrams of example systems in accordance with one or more embodiments.

DETAILED DESCRIPTION

Some optical components use thermo-optic effects, which involve refractive index changes caused by temperature variations in a material. For example, thermo-optic phase-shifting devices may heat a waveguide material to change its refractive index, and thereby control switching, attenuation or modulation of an optical signal. In some examples, a metal heater is used to avoid doping the waveguide. However, due to process limitations and to avoid optical loss, the heater must be positioned at some distance from the waveguide. This distance between the heater and the waveguide may result in poor heat transfer to the waveguide. In addition, the heater may lose a portion of the generated heat through conduction with the substrate upon which the heater is mounted. Accordingly, it may be necessary to operate the heater at a relatively high temperature, thereby resulting in relatively high power consumption. Further, the relatively high temperature and power use may cause the components of the device to suffer material degradation or failure over time. For example, a power supply connector of the heater (referred to as a "tether") may experience current crowding and overheating when providing the input current to the heater.

Embodiments described herein may provide improved thermo-optic devices. In some embodiments, a heart transfer material having relatively high heat conductance may be disposed in the space between the heater and the waveguide. The heat transfer material may improve the efficiency of the heater by reducing the thermal resistance between the heater and the waveguide. Further, the heat transfer material may allow heat generated within the waveguide (e.g., from input light from a laser or other source) to dissipate more rapidly and efficiently in comparison to devices that do not include the heat transfer material. In this manner, the heat transfer material may reduce excess heating due to input light. Furthermore, the heat transfer material may reduce the laser heating temperature and time constant by allowing faster local heating diffusing from the waveguide. Such reduced laser heating of resonant optical devices (e.g., ring modulators) may suppress thermal nonlinearity effects, and may allow the use of more compact ring modulators that use higher input power. In some embodiments, an undercut void may be formed beneath the heater to reduce heat loss through the substrate. As such, some embodiments may reduce wasted heat that is conducted to the substrate. Further, in some embodiments, a power supply connector of the heater (referred to as a "tether") may be shaped to provide contact with multiple vias, and may thereby reduce current choking and overheating in the tether. Accordingly, embodiments may reduce the power consumption of the heater, and reduce the likelihood of degradation or failure of device components.

Figure 1:
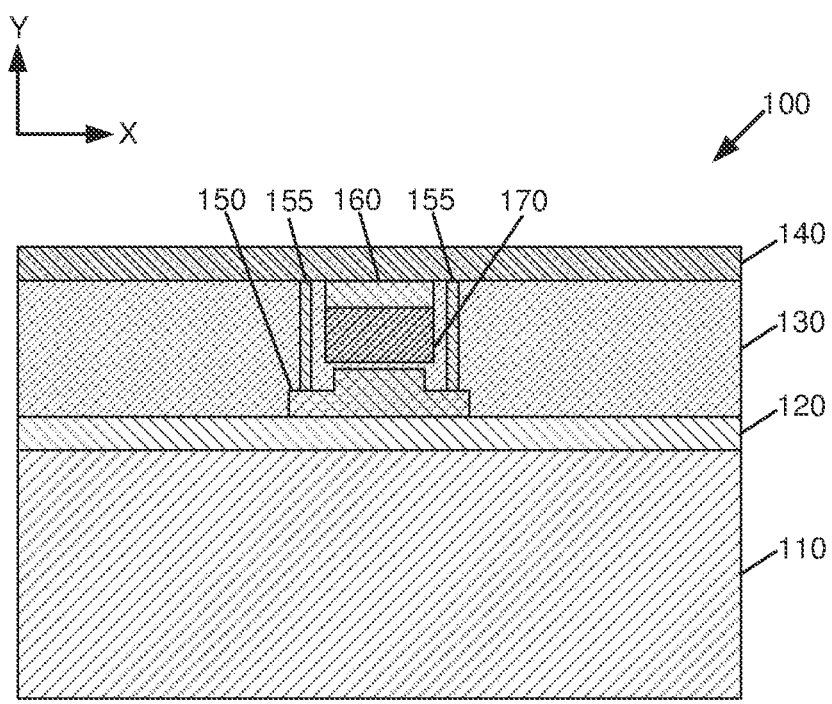
FIG. 1 is a diagram of an example thermo-optic device in accordance with one or more embodiments.

FIG. 1—Example Thermo-Optic Device

Referring now to FIG. 1, an illustration of a thermo-optic device 100 is shown in cross sectional view, in accordance with one or more embodiments. For example, in some embodiments, the thermo-optic device 100 may be a thermo-optic phase shifter or tuner (e.g., a tunable optical ring resonator).

As shown in FIG. 1, in some embodiments, the device 100 may include a base layer 120 formed on a substrate 110. For example, the substrate 110 may be silicon substrate. Further, the base layer 120 may be an electrically insulating material such as an oxide layer (e.g., silicon oxide), a nitride layer (e.g., silicon nitride), and so forth. As shown, a waveguide 150 may be formed on the base layer 120, and a heater 160 may be formed at a distance above the waveguide 150. In some embodiments, the heater 160 may be composed of a metal. The waveguide 150 may be coupled to metal contacts 155. As used herein, the term "waveguide assembly" may refer to the combination of the heater 160, the waveguide 150, and any material disposed between the heater 160 and the waveguide 150.

Note that, in describing embodiments herein, the term "above" refers to the direction in which optical or electronic components are formed relative to the substrate 110 (i.e., the direction illustrated by the Y arrow shown in FIG. 1). Further, the term "lateral" refers to a direction that is parallel to the top planar surface of the substrate 110 (for example, the direction illustrated by the X arrow shown in FIG. 1).

In some embodiments, a heat transfer layer 170 may be disposed between the heater 160 and the waveguide 150. As shown, a cladding layer 130 may laterally surround the waveguide 150, the metal contacts 155, the heat transfer layer 170, and the heater 160. The cladding layer 130 may be an electrically insulating material (e.g., an oxide layer, a nitride layer, etc.) that is formed on the base layer 120.

In some embodiments, the heat transfer layer 170 may be a material that has relatively high heat conduction (e.g., at least ten times more conductive that the cladding layer 130 or the base layer 120). Further, the heat transfer layer 170 may be a material that does not interact chemically with the heater 160 or the waveguide 150. For example, the heat transfer layer 170 may be composed of one or more of silicon dioxide, silicon nitride, silicon oxynitride, aluminum nitride, boron nitride, and so forth. As such, embodiments including the heat transfer layer 170 may increase the amount of heat transfer from the heater 160 to the waveguide 170 in comparison to embodiments that do not include the heat transfer layer 170. Accordingly, some embodiments may reduce the power consumption of the heater 160, and reduce the likelihood of degradation or failure of device components. Further, the heat transfer layer 170 may allow heat generated within the waveguide 150 from input light to dissipate more rapidly and efficiently in comparison to devices that do not include the heat transfer layer 170, and may thereby reduce excess heating due to input light. Furthermore, the heat transfer layer 170 may reduce the laser heating temperature and time constant by allowing faster local heating diffusing from the waveguide 150. Such reduced laser heating may suppress thermal nonlinearity effects, and may allow the use of more compact optical devices that use higher input power.

In some embodiments, the structure of the heat transfer layer 170 may be defined by etching (e.g., by etching into the cladding layer 130). Further, the heat transfer layer 170 may be formed by a chemical deposition technique. As shown in FIG. 1, in some embodiments, the heat transfer layer 170 does not extend beyond the edges of the heater 160 in a lateral direction.

In some embodiments, a top layer 140 may be formed on the heater 160 and the cladding layer 130. For example, the top layer 140 may be a cladding layer of electrically insulating material (e.g., an oxide layer, a nitride layer, etc.). In other examples, the top layer may be one or more layers that include circuit elements, cladding, optical elements, and so forth.

Figure 2:
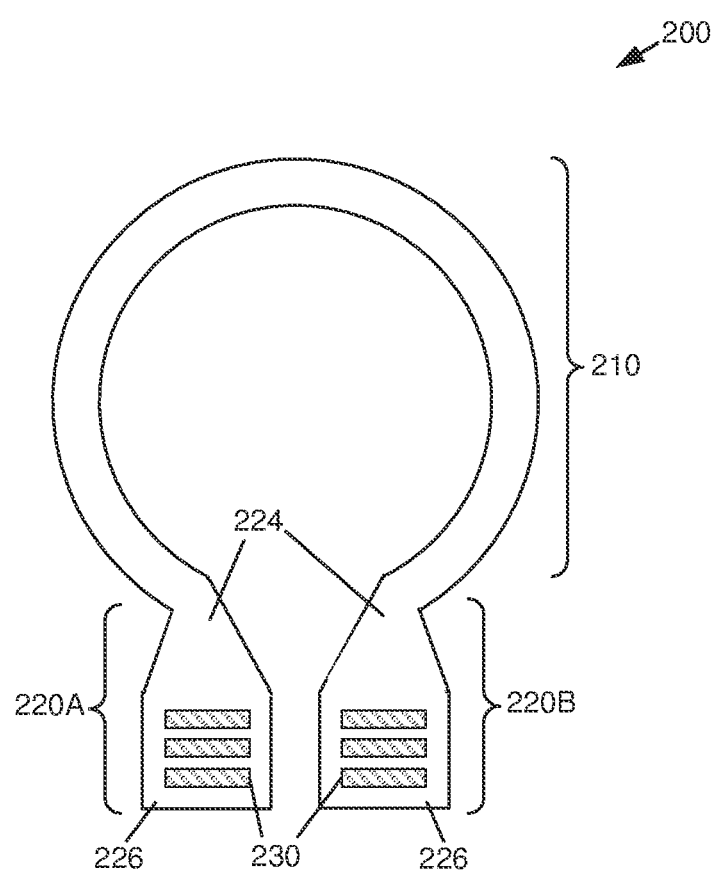
FIG. 2 is a diagram of an example heater device in accordance with one or more embodiments.

FIG. 2—Example Heater Device

Referring now to FIG. 2, an illustration of an example heater device 200 is shown in a top view, in accordance with one or more embodiments. In some embodiments, the heater device 200 may correspond generally to the heater 160 (shown in FIG. 1). Assume that, in some embodiments, the heater device 200 may be positioned above the waveguide of an optical ring resonator (not shown in FIG. 2).

As shown in FIG. 2, the heater device 200 may include a ring-shaped heating segment 210 joined to tethers 220A and 220B (also referred to as 'tethers 220"). The tethers 220 may be connectors that provide electric power to the heating segment 210. Each tether 220 may include a first portion 224 that is joined to the heating segment 210. As shown, the first portion 224 may have a substantially triangular shape, and may widen as it extends away from the heating segment 210. For example, in some embodiments, the width of first portion 224 may at least double as it extends away from the heating segment 210.

Further, in some embodiments, each tether 220 may include a second portion 226 that is distal from the heating segment 210. As shown, the second portion 226 may have a substantially rectangular shape, and may be joined to multiple vias 230 that provide electric current to the tether 220. In some embodiments, the vias 230 may extend above the tether 220, and may have a cross-sectional shape that is substantially rectangular. In some embodiments, the second portion 226 of the tether 220 may be shaped to accommodate at least three vias 230 in a parallel arrangement. For example, as shown in FIG. 2, the vias 230 may be parallel to each other along a long edge of the rectangular cross-section of each via 230. Further, as shown in FIG. 2, a long edge of the rectangular cross-section of each via 230 may be oriented toward (i.e., facing toward) the first portion 224. In some embodiments, the tether 220 may provide a wider current path in comparison to conventional tether designs, and may thereby reduce current choking and overheating in the tether 220. Accordingly, some embodiments may reduce the likelihood of degradation or failure of device components.

FIGS. 3 and 4A-4E—Example Method

Figure 3:
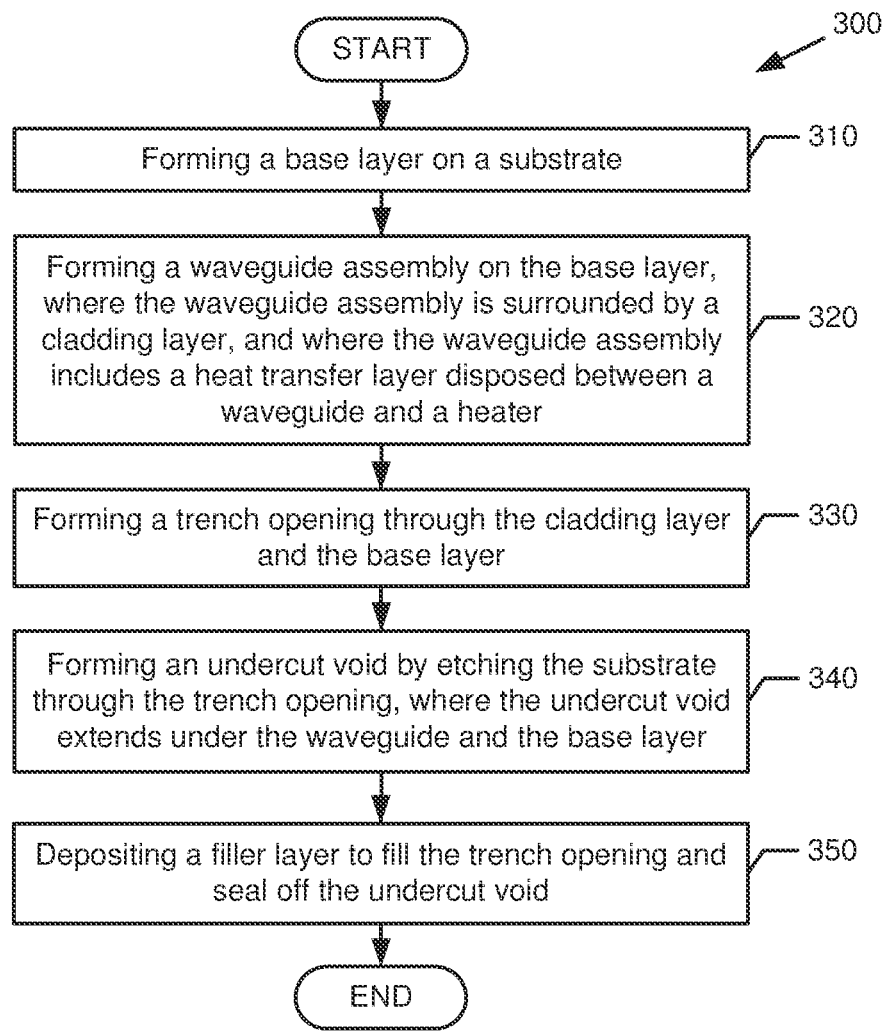
FIG. 3 is a flow diagram of an example method in accordance with one or more embodiments.

Referring now to FIG. 3, shown is a flow diagram of a method 300 for forming a thermo-optic device with an undercut void, in accordance with one or more embodiments. For the sake of illustration, the actions involved in the method 300 are described below with reference to example structures shown in FIGS. 4A-4E. However, the scope of the various embodiments discussed herein is not limited in this regard.

Figure 4A:
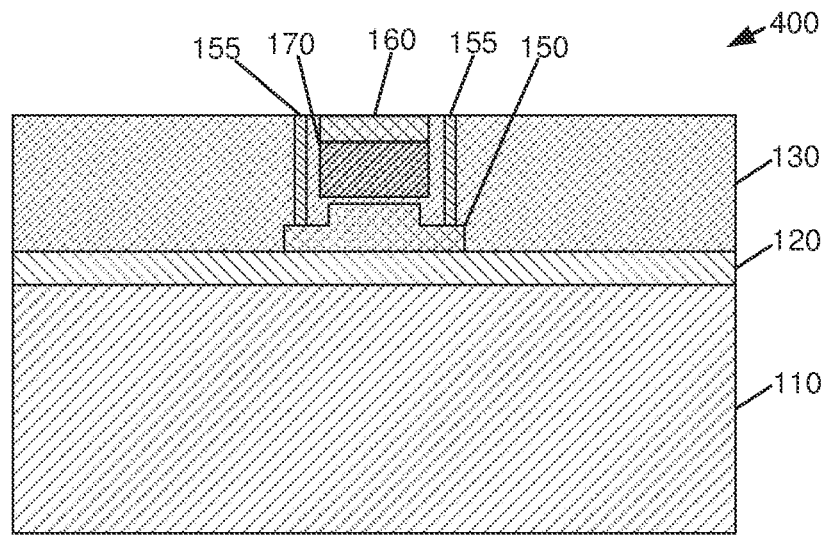
FIGS. 4A-4E are illustrations of an example method in accordance with one or more embodiments.

Block 310 may include forming a base layer on a substrate. Block 320 may include forming a waveguide assembly on the base layer, where the waveguide assembly is surrounded by a cladding layer, and where the waveguide assembly includes a heat transfer layer disposed between a waveguide and a heater. For example, referring to FIG. 4A, a thermo-optic device 400 may include a substrate 110, a base layer 120, a waveguide 150, metal contacts 155, a heater 160, a heat transfer layer 170, and a cladding layer 130. Assume that FIG. 4A illustrates a point in time after the heater 160 is formed, but prior to forming additional layers or elements above the heater 160.

Figure 4B:
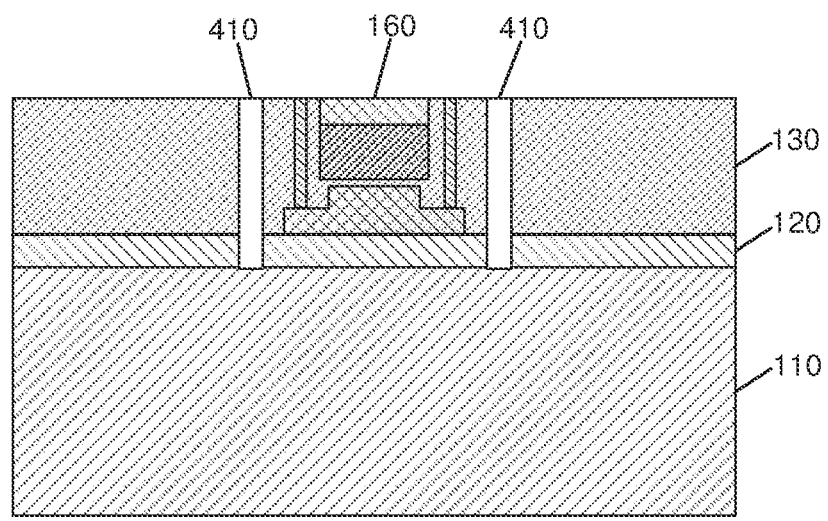
Figure 4C:
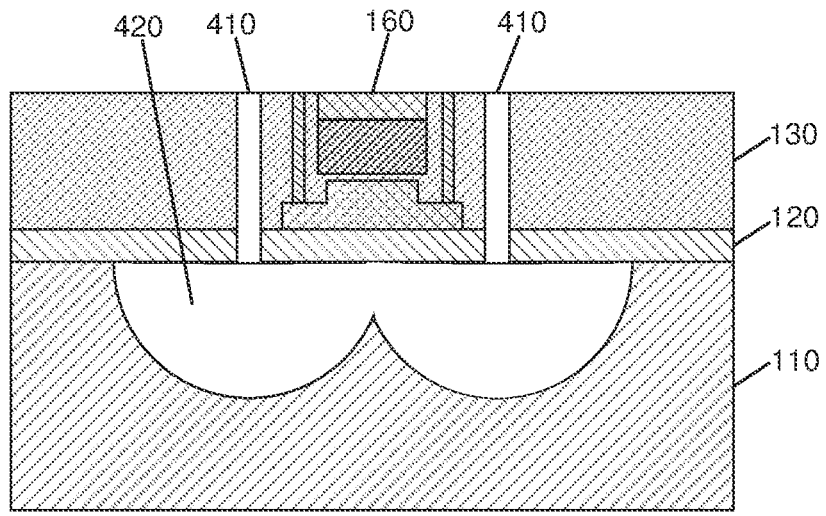
Figure 4D:
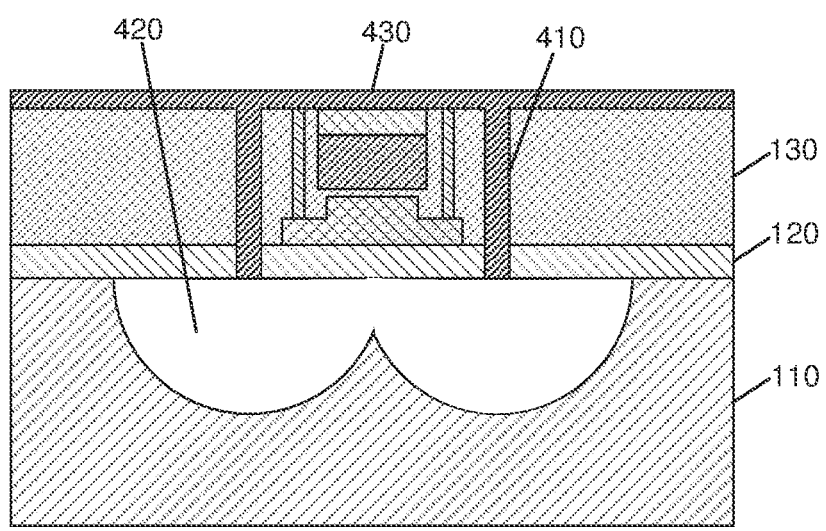
Figure 4E:
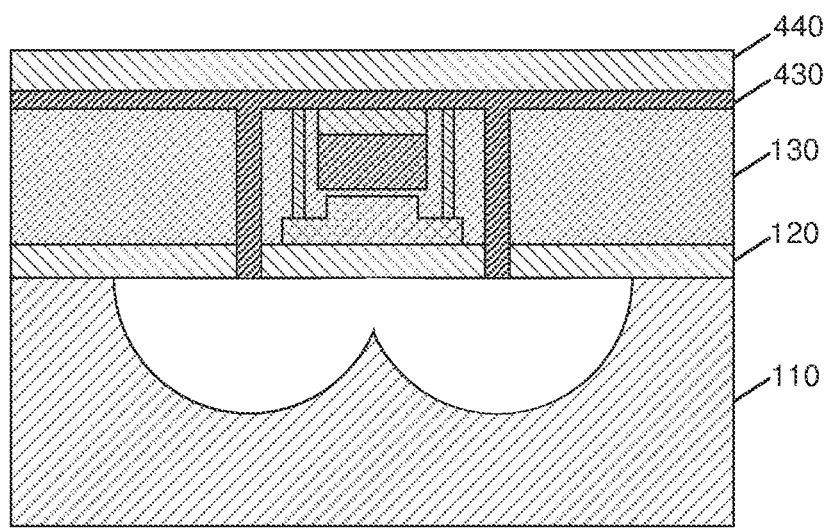

Block 330 may include forming a trench opening through the cladding layer and the base layer. For example, referring to FIG. 4B, the trench openings 410 are formed through the cladding layer 130 and the base layer 120. In some embodiments, the trench openings 410 may be formed by etching through the cladding layer 130 and the base layer 120, thereby exposing the substrate 110. As shown in FIG. 4B, the trench openings 410 may be laterally proximate to the waveguide assembly (i.e., the waveguide 150, the heater 160, and the heat transfer layer 170), but do not contact the waveguide assembly.

Block 340 may include forming an undercut void by etching the substrate through the trench opening, where the undercut void extends under the waveguide and the base layer. For example, referring to FIG. 4C, a portion of the substrate 110 has been removed to form an undercut void 420. In some embodiments, the undercut void 420 may be formed by performing isotropic etching of the substrate 110 through the trench openings 410 (e.g., using plasma etching, wet chemical etching, vapor phase etching, and so forth). As shown, the undercut void 420 may extend laterally under the portion of the base layer 120 that supports the waveguide 150. In some examples, the undercut void 420 is less thermally conductive than the substrate 110, and may thus reduce heat conduction from the heater 160 to the substrate 110. Accordingly, the undercut void 420 may reduce the amount of heat output of the heater 160 that is wasted (i.e., not used to heat the waveguide 150), and may therefore improve the efficiency of the heater 160. However, forming the undercut void 420 and the trench openings 410 may weaken the structural integrity of the waveguide assembly. For example, forming the trench openings 410 includes removing portions of the cladding layer 130, thereby reducing the lateral support of the waveguide assembly. Accordingly, the thermo-electric device may be more likely to suffer mechanical failure. Further, if the thermo-optical device 400 requires subsequent operations (i.e., after forming the undercut void 420) to form additional elements or layers on the cladding layer 130, the trench openings 410 may result in difficulties during these subsequent operations. For example, if an additional layer is deposited as a material that can flow relatively easily (e.g., as a low viscosity liquid, a gas, and so forth), this deposited material may enter the undercut void 420. In this manner, the undercut void 420 may be filled and thus rendered ineffective and/or useless.

Block 350 may include depositing a filler layer to fill the trench opening and seal off the undercut void. For example, referring to FIG. 4D, a filler layer 430 has been deposited over the cladding layer 130, thereby filling and sealing off the trench openings 410. The filler layer 430 may be a conformal deposition of an oxide material, such as one or more of silicon dioxide, silicon nitride, silicon oxynitride, and so forth. In some embodiments, the filler layer 430 may be silicon dioxide film deposited from tetraethylorthosilicate (TEOS) using plasma-enhanced chemical vapor deposition (PECVD). In some embodiments, filling the trench openings 410 with the filler layer 430 may improve the structural integrity of the waveguide assembly. For example, filling the trench openings 410 may strengthen the lateral support of the waveguide assembly. Accordingly, some embodiments may reduce the likelihood of mechanical failure in the thermo-electric device. After block 350, the method 300 may be completed.

In some embodiments, the method 300 may be completed before forming additional elements of the thermo-optic device. Accordingly, in some examples, block 350 may be followed by depositing additional layer(s) over the filler layer to complete the thermo-optic device. Such additional layer(s) may include circuit elements, cladding, optical elements, and so forth. For example, referring to FIG. 4E, an additional layer(s) 440 has been deposited over the filler layer 430. The filler layer 430 seal offs the trench openings 410, thereby preventing any material from entering the undercut void 420 while the additional layer(s) 440 are being formed. In this manner, depositing the filler layer 430 to deal off the trench openings 410 may prevent the undercut void 420 from being filled and thus rendered ineffective and/or useless.

FIGS. 5A-5B—Example Systems

Referring now to FIG. 5A, shown is a block diagram of a system in accordance with an embodiment. As shown in FIG. 5A, system 500 may be any type of computing system, ranging from a small portable device to larger devices such as desktop computers, server computers or so forth.

In the high level shown in FIG. 5A, system 500 includes various electrical ICs and multiple photonic ICs. Specifically, as shown, a first electrical IC 505, which may be implemented as a CMOS IC, includes a plurality of drivers 5081-*n*. Although embodiments are not limited in this regard, assume that IC 500 is a SoC or other processor. Drivers 508 may be implemented to receive incoming data or other information from a source circuit within IC 505, such as a processing core or other source circuit. In turn, drivers 508 communicate information electrically to a plurality of ring modulators 5141-*n*, which are adapted on a first silicon photonic (SiPh) IC 510. Photonic IC 510 may have transmitter circuitry including a multi-wavelength DFB laser 512 to efficiently generate optical energy of multiple wavelengths.

Ring modulators 514 each may be configured to modulate incoming information onto a carrier optical signal of a given wavelength. In turn, the modulated optical signals are amplified in an optical amplifier 516, which may be implemented as a semiconductor optical amplifier (SOA).

Still with reference to FIG. 5A, the information communicated from IC 510 may be coupled via one or more couplers 518 to an optical interconnect 520, shown as one or more optical fibers. In turn, optical interconnect 520 couples, via another one or more couplers 519, to another SiPh IC 520, which in this illustration includes receiver circuitry. Specifically, as shown, a plurality of demultiplexers 5241-*n* are provided to receive the modulated optical information of a given wavelength, which may then be converted in photodetectors 525 to electrical information that in turn is provided to another electrical IC 530. In an embodiment, second electrical IC 530, which may be implemented as a CMOS IC, includes a plurality of transimpedance amplifiers 5321-*n*. Although embodiments are not limited in this regard, IC 530 may be another SoC, a memory for IC 510 or another such electrical circuit. Understand while shown at this high level in the embodiment of FIG. 5, many variations and alternatives are possible. For example, an additional power IC (which may include a control circuit such as control circuit 350 of FIG. 3) may be present that includes circuitry to control lasers and SOAs of the SiPh ICs. Of course, this control circuitry instead may be present in an electrical IC (such as CMOS IC 505).

Referring now to FIG. 5B, shown is a block diagram of a system in accordance with another embodiment. As shown in FIG. 5B, system 500' may generally be configured the same as system 500 of FIG. 5A, and thus same numbering applies. In this implementation however, electrical and optical ICs are implemented in corresponding packages 501, 502 that are coupled via optical interconnect 520. Note that in various implementations, different manners of packaging CMOS and SiPh ICs may be realized, including commonly packaging multiple die of these ICs into a common package, such that a single package includes one or more CMOS die and one or more SiPh die.

Figure 6:
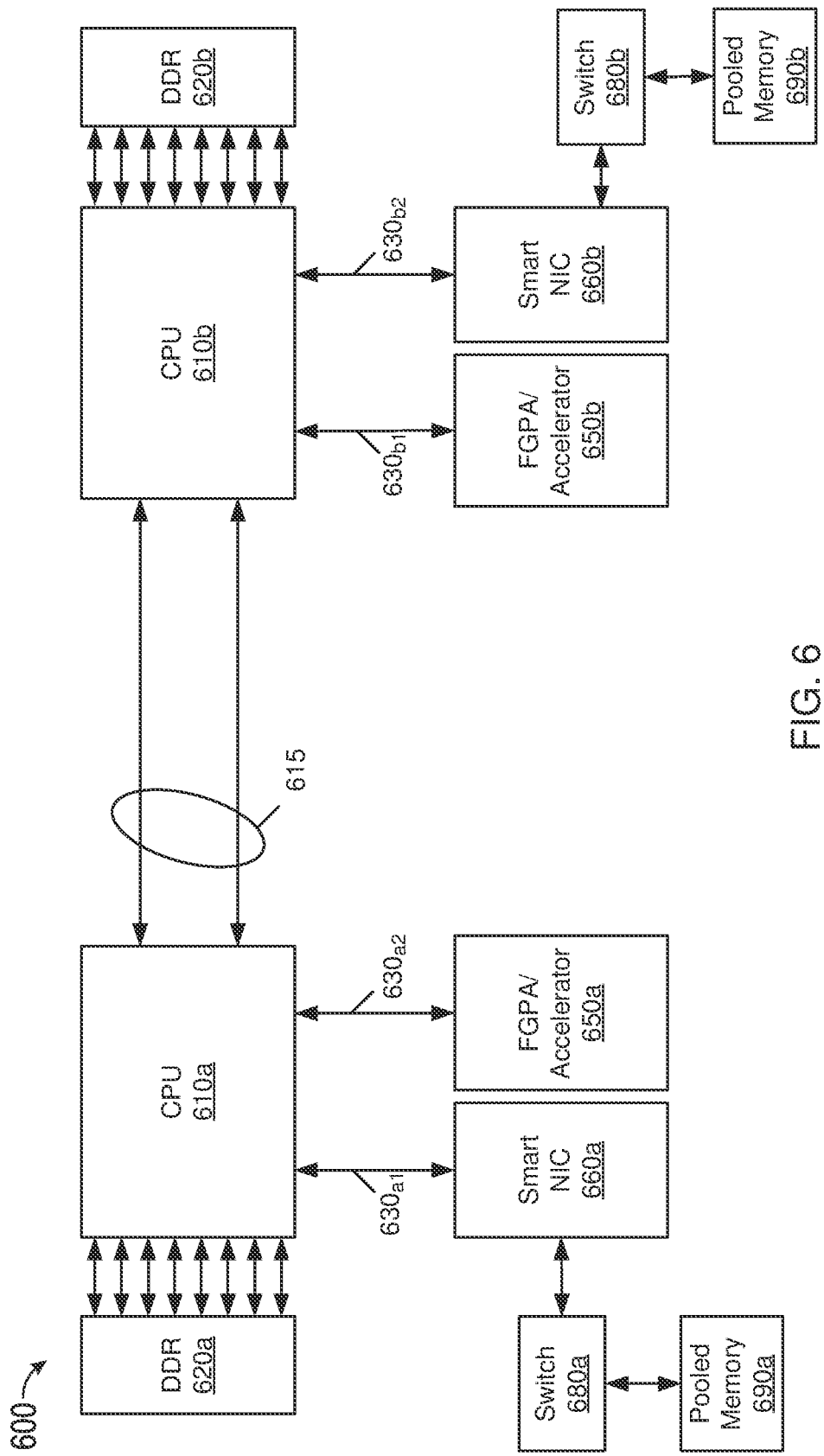
FIG. 6 is a diagram of an example system in accordance with one or more embodiments.

FIG. 6—Example System

Embodiments may be implemented in a variety of other computing platforms. Referring now to FIG. 6, shown is a block diagram of a system in accordance with another embodiment. As shown in FIG. 6, a system 600 may be any type of computing device, and in one embodiment may be a server system such as an edge platform. In the embodiment of FIG. 6, system 600 includes multiple CPUs 610*a,b* that in turn couple to respective system memories 620*a,b* which in embodiments may be implemented as double data rate (DDR) memory. Note that CPUs 610 may couple together via an interconnect system 615, which in an embodiment can be an optical interconnect that communicates with optical circuitry (which may be included in or coupled to CPUs 610).

To enable coherent accelerator devices and/or smart adapter devices to couple to CPUs 610 by way of potentially multiple communication protocols, a plurality of interconnects 630*a1-b2* may be present. In an embodiment, each interconnect 630 may be a given instance of a Compute Express Link (CXL) interconnect.

In the embodiment shown, respective CPUs 610 couple to corresponding field programmable gate arrays (FPGAs)/accelerator devices 650*a,b* (which may include graphics processing units (GPUs), in one embodiment. In addition CPUs 610 also couple to smart network interface circuit (NIC) devices 660 *a,b*. In turn, smart NIC devices 660*a,b* couple to switches 680*a,b* that in turn couple to a pooled memory 690*a,b* such as a persistent memory.

Figure 7:
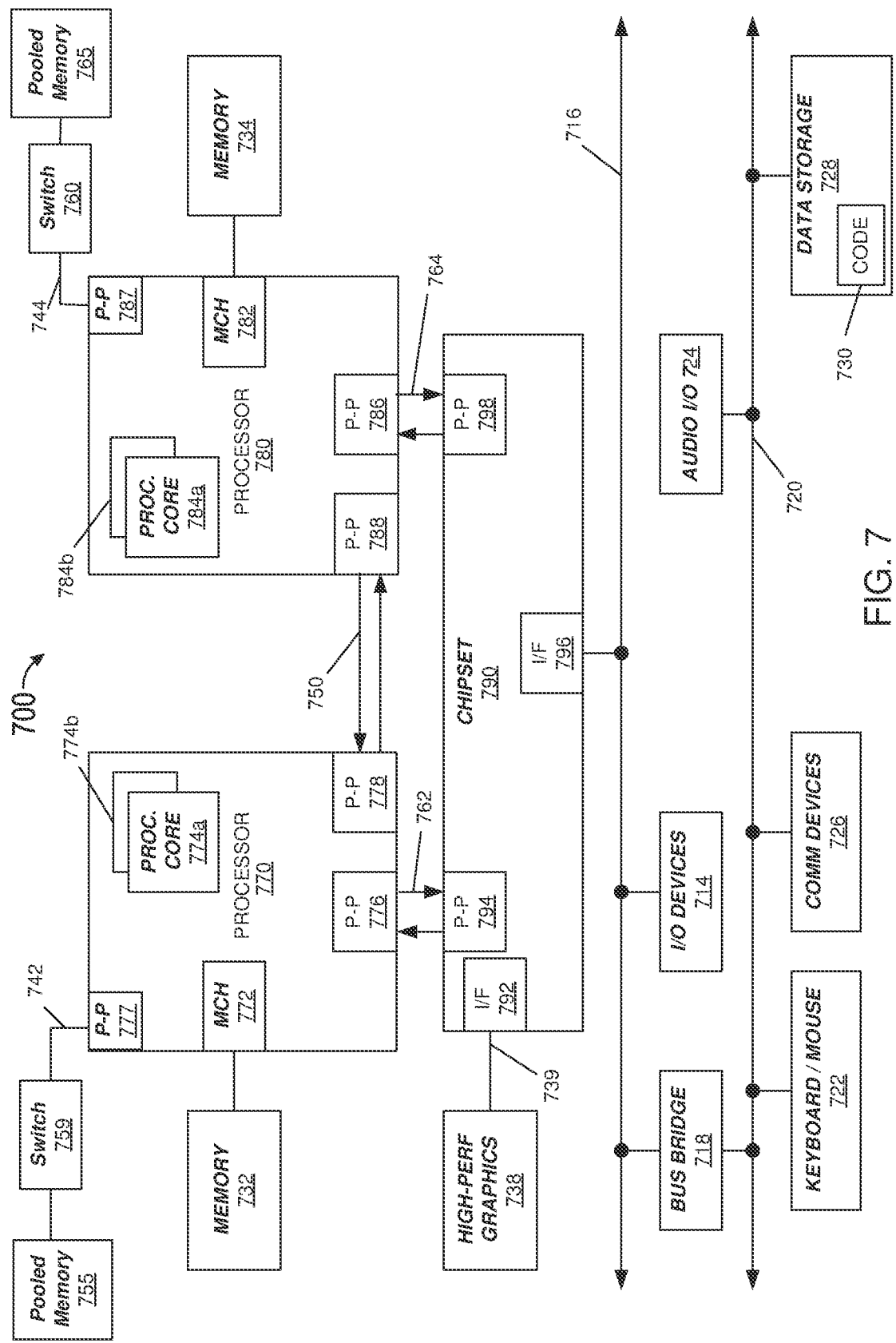
FIG. 7 is a diagram of an example system in accordance with one or more embodiments.

FIG. 7—Example System

Referring now to FIG. 7, shown is a block diagram of a system in accordance with another embodiment such as an edge platform. As shown in FIG. 7, multiprocessor system 700 includes a first processor 770 and a second processor 780 coupled via an interconnect 750, which in an embodiment can be an optical interconnect that communicates with optical circuitry (which may be included in or coupled to processors 770). As shown in FIG. 7, each of processors 770 and 780 may be many core processors including representative first and second processor cores (i.e., processor cores 774*a* and 774*b* and processor cores 784*a* and 784*b*).

In the embodiment of FIG. 7, processors 770 and 780 further include point-to point interconnects 777 and 787, which couple via interconnects 742 and 744 (which may be CXL buses) to switches 759 and 760. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

The following clauses and/or examples pertain to further embodiments.

In Example 1, a method may include: forming a base layer on a substrate; forming a waveguide assembly on the base layer, wherein the waveguide assembly is surrounded by a cladding layer; forming a trench opening through the cladding layer and the base layer; forming an undercut void by etching the substrate through the trench opening, wherein the undercut void extends under the waveguide assembly and the base layer; and filling the trench opening with a filler to seal off the undercut void.

In Example 2, the subject matter of Example 1 may optionally include that filling the trench opening with the filler includes depositing a conformal oxide layer into the trench opening.

In Example 3, the subject matter of Examples 1-2 may optionally include that the conformal oxide layer comprises one selected from silicon dioxide, silicon nitride, and silicon oxynitride.

In Example 4, the subject matter of Examples 1-3 may optionally include that depositing the conformal oxide layer comprises depositing a silicon dioxide film from tetraethylorthosilicate (TEOS) using plasma-enhanced chemical vapor deposition (PECVD).

In Example 5, the subject matter of Examples 1-4 may optionally include that forming the waveguide assembly comprises: forming a waveguide on the base layer; forming a heater positioned above the waveguide; and forming a heat transfer layer between waveguide and the heater.

In Example 6, the subject matter of Examples 1-5 may optionally include that the heat transfer layer comprises one selected from silicon dioxide, silicon nitride, silicon oxynitride, and aluminum nitride.

In Example 7, the subject matter of Examples 1-6 may optionally include that forming the undercut void comprises performing an isotropic etching of the substrate.

In Example 8, the subject matter of Examples 1-7 may optionally include that performing the isotropic etching comprises performing one selected from plasma etching, wet chemical etching, and vapor phase etching.

In Example 9, a computing device may include: one or more processors and a memory having stored therein a plurality of instructions that when executed by the one or more processors, cause the computing device to perform the method of any of Examples 1 to 8.

In Example 10, at least one machine-readable medium has stored thereon data which, if used by at least one machine, causes the at least one machine to perform the method of any of Examples 1 to 8.

In Example 11, an electronic device may include means for performing the method of any of Examples 1 to 8.

In Example 12, an apparatus may include: a substrate; an oxide base layer disposed on the substrate; a waveguide disposed on the oxide base layer; a heater positioned over the waveguide; and a heat transfer layer disposed between the heater and the waveguide, where the heat transfer layer is to transfer heat from the heater to the waveguide.

In Example 13, the subject matter of Example 12 may optionally include that the heat transfer layer is one selected from silicon dioxide, silicon nitride, silicon oxynitride, and aluminum nitride.

In Example 14, the subject matter of Examples 12-13 may optionally include an oxide cladding that laterally surrounds the heater, the heat transfer layer, and the waveguide.

In Example 15, the subject matter of Examples 12-14 may optionally include: a trench opening through the oxide cladding and the oxide base layer; and an undercut void extending under the waveguide and the oxide base layer, where the trench opening is filled with a conformal oxide filler that seals off the undercut void.

In Example 16, the subject matter of Examples 12-15 may optionally include that the conformal oxide filler is one selected from silicon dioxide, silicon nitride, and silicon oxynitride.

In Example 17, the subject matter of Examples 12-16 may optionally include that the conformal oxide layer comprises a silicon dioxide film deposited from tetraethylorthosilicate (TEOS) using plasma-enhanced chemical vapor deposition (PECVD).

In Example 18, the subject matter of Examples 12-17 may optionally include a tether to provide a supply current to the heater, where the tether comprises a first portion and a second portion, where the first portion is joined to the heater, and where the second portion is joined to a plurality of vias that provide the supply current to the tether.

In Example 19, the subject matter of Examples 12-18 may optionally include that the heat transfer layer does not extend beyond an edge of the heater in a lateral direction.

In Example 20, the subject matter of Examples 12-19 may optionally include that the apparatus is an optical ring resonator, and that the heat transfer layer is to reduce thermal nonlinearity in the optical ring resonator.

In Example 21, an apparatus may include: a waveguide disposed on a base layer; a heater positioned over the waveguide; a tether to provide a supply current to the heater, where a first portion of the tether is joined to the heater, where a second portion of the tether is joined to a plurality of vias that provide the supply current to the tether, and where a width of the second portion is at least double a width of the first portion.

In Example 22, the subject matter of Example 21 may optionally include that the plurality of vias comprises at least three vias.

In Example 23, the subject matter of Examples 21-22 may optionally include that each of the plurality of vias has a rectangular cross-section, and that the plurality of vias are parallel to each other along a long edge of the rectangular cross-section of each via.

In Example 24, an apparatus may include: means for forming a base layer on a substrate; means for forming a waveguide assembly on the base layer, wherein the waveguide assembly is surrounded by a cladding layer; means for forming a trench opening through the cladding layer and the base layer; means for forming an undercut void by etching the substrate through the trench opening, where the undercut void extends under the waveguide assembly and the base layer; and means for filling the trench opening with a filler to seal off the undercut void.

In Example 25, the subject matter of Example 24 may optionally include that the means for filling the trench opening with the filler comprises means for depositing a conformal oxide layer into the trench opening.

In Example 26, the subject matter of Examples 24-25 may optionally include that the conformal oxide layer comprises one selected from silicon dioxide, silicon nitride, and silicon oxynitride.

In Example 27, the subject matter of Examples 24-26 may optionally include that the means for depositing the conformal oxide layer comprises means for depositing a silicon dioxide film from tetraethylorthosilicate (TEOS) using plasma-enhanced chemical vapor deposition (PECVD).

In Example 28, the subject matter of Examples 24-27 may optionally include that the means for forming the waveguide assembly comprises: means for forming a waveguide on the base layer; means for forming a heater positioned above the waveguide; and means for forming a heat transfer layer between waveguide and the heater.

In Example 29, the subject matter of Examples 24-28 may optionally include that the heat transfer layer comprises one selected from silicon dioxide, silicon nitride, silicon oxynitride, and aluminum nitride.

In Example 30, the subject matter of Examples 24-29 may optionally include that the means for forming the undercut void comprises means for performing an isotropic etching of the substrate.

Embodiments described herein may provide improved thermo-optic devices. In some embodiments, a heart transfer material having relatively high heat conductance may be disposed in the space between the heater and the waveguide. The heat transfer material may improve the efficiency of the heater by reducing the thermal resistance between the heater and the waveguide. Further, the heat transfer material may allow heat generated within the waveguide to dissipate more rapidly and efficiently in comparison to devices that do not include the heat transfer material. In this manner, the heat transfer material may reduce excess heating due to input light. Furthermore, the heat transfer material may reduce the laser heating temperature and time constant by allowing faster local heating diffusing from the waveguide. Such reduced laser heating of resonant optical devices may suppress thermal nonlinearity effects, and may allow the use of more compact ring modulators with higher input power. In some embodiments, an undercut void may be formed beneath the heater to reduce heat loss through the substrate. As such, some embodiments may reduce wasted heat that is conducted to the substrate. Further, in some embodiments, a tether of the heater may be shaped to provide contact with multiple vias, and may thereby reduce current choking and overheating in the tether. Accordingly, embodiments may reduce the power consumption of the heater, and reduce the likelihood of degradation or failure of device components.

Note that, while FIGS. 1-7 illustrate various example implementations, other variations are possible. For example, it is contemplated that one or more embodiments described with reference to FIGS. 1-4E may be variously implemented in the example devices described with reference to FIGS. 5A-7. For example, it is contemplated that the ring modulators 514 (shown in FIG. 5A) may implement the thermo-optical device 100 (shown in FIG. 1), the tethers 220 (shown in FIG. 2), and/or the thermo-optical device 400 (shown in FIGS. 4A-4E.

Note that the examples shown in FIGS. 1-7 are provided for the sake of illustration, and are not intended to limit any embodiments. Specifically, while embodiments may be shown in simplified form for the sake of clarity, embodiments may include any number and/or arrangement of components. For example, it is contemplated that some embodiments may include any number of components in addition to those shown, and that different arrangement of the components shown may occur in certain implementations. Furthermore, it is contemplated that various specifics in the examples shown in FIGS. 1-7 may be used anywhere in one or more embodiments.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a substrate comprising silicon;
    a base layer on the substrate, wherein the base layer comprises silicon oxide;
    a waveguide on the base layer;
    a heater over the waveguide, wherein the heater comprises a metal;
    a heat transfer layer between the heater and the waveguide, wherein the heat transfer layer comprises a compound of nitrogen and at least one of silicon, aluminum or boron; and
    a cladding layer that laterally surrounds the heater, the heat transfer layer, and the waveguide, wherein the cladding layer comprises silicon oxide.

2. The apparatus of claim 1, wherein the heat transfer layer is at least ten times more thermally conductive than the cladding layer or the base layer.

3. The apparatus of claim 1, comprising:
    a trench opening through the cladding layer and through the base layer; and
    an undercut void extending under the waveguide and the base layer,
    wherein the trench opening is sealed from the undercut void with a filler comprising silicon and oxygen.

4. The apparatus of claim 3, wherein the filler is silicon dioxide or silicon oxynitride.

5. The apparatus of claim 4, wherein the filler comprises a silicon dioxide film.

6. The apparatus of claim 1, comprising a tether to provide a supply current to the heater, wherein the tether comprises a first portion and a second portion, wherein the first portion is joined to the heater, and wherein the second portion is joined to a plurality of vias that provide the supply current to the tether.

7. The apparatus of claim 6, wherein the plurality of vias comprises at least three vias.

8. The apparatus of claim 7, wherein each of the plurality of vias has a rectangular cross-section, and wherein the plurality of vias are parallel to each other along a long edge of the rectangular cross-section of each via.

9. The apparatus of claim 1, wherein the heat transfer layer does not extend beyond an edge of the heater in a lateral direction.

10. The apparatus of claim 1, wherein the apparatus is an optical ring resonator.

11. The apparatus of claim 1, wherein the heater is in direct contact with the heat transfer layer.

12. The apparatus of claim 11, wherein the heat transfer layer is separated from the waveguide by an intervening portion of the cladding layer.

13. The apparatus of claim 12, wherein the heat transfer layer does not extend in a lateral direction beyond an edge of the heater.

14. The apparatus of claim 1, further comprising a first contact passing through the cladding layer and intersecting a first edge portion of the waveguide laterally beyond a first edge of the heater, wherein the first contact comprises a metal.

15. The apparatus of claim 14, further comprising a second contact passing through the cladding layer and intersecting a second, opposite, edge portion of the waveguide laterally beyond a second, opposite, edge of the heater, wherein the second contact comprises the metal, and wherein the heater is between the first contact and the second contact and is over a center portion of the waveguide.

16. The apparatus of claim 15, wherein the heat transfer layer is between the first contact and the second contact and is between the heater and the center portion of the waveguide.

17. The apparatus of claim 1, wherein the heater is separate from the waveguide by a distance and the heat transfer layer occupies a majority of the distance.

* * * * *